United States Patent [19]

Harbolt et al.

[11] Patent Number: 4,863,645

[45] Date of Patent: Sep. 5, 1989

[54] APPARATUS AND PROCESS FOR PRODUCING PARTICULATE SULFUR

[75] Inventors: Bruce A. Harbolt, Northridge; David W. Howell, Fullerton, both of Calif.

[73] Assignee: Union Oil Company of California, Los Angeles, Calif.

[21] Appl. No.: 102,582

[22] Filed: Sep. 29, 1987

[51] Int. Cl.$^4$ .............................................. B29B 9/10
[52] U.S. Cl. ........................................ 264/13; 264/14; 264/37; 425/6; 425/10
[58] Field of Search ..................... 264/13, 14, 8, 9, 37; 425/6, 7, 8, 10

[56] References Cited

U.S. PATENT DOCUMENTS

| | | | |
|---|---|---|---|
| 3,070,837 | 1/1963 | Loertscher et al. | 264/14 |
| 3,334,159 | 8/1967 | Campbell | 264/13 |
| 3,504,061 | 3/1970 | Elliott | 264/14 |
| 3,551,532 | 12/1970 | Laird | 264/11 |
| 3,830,631 | 8/1974 | Young et al. | 23/252 R |
| 3,891,730 | 6/1975 | Wessel et al. | 264/11 |
| 3,970,552 | 7/1976 | Bongert | 210/19 |
| 4,024,210 | 5/1977 | Chalmers | 264/11 |
| 4,081,500 | 3/1978 | Malcolm | 264/9 |
| 4,082,823 | 4/1978 | Augustine et al. | 264/7 |
| 4,149,837 | 4/1979 | Baker et al. | 425/10 |
| 4,151,234 | 4/1979 | Schofield | 264/13 |
| 4,385,929 | 5/1983 | Ichidate et al. | 75/0.5 C |
| 4,389,356 | 6/1983 | Higgins | 264/9 |
| 4,402,885 | 9/1983 | Roehrig et al. | 264/11 |
| 4,437,883 | 3/1984 | Kubo et al. | 75/0.5 C |
| 4,595,350 | 6/1986 | Harbolt et al. | 425/7 |

- FOREIGN PATENT DOCUMENTS

| | | | |
|---|---|---|---|
| 0064311 | 11/1982 | European Pat. Off. | 264/14 |
| 135530 | 11/1976 | Japan | |
| 1161592 | 8/1969 | United Kingdom | 264/14 |

Primary Examiner—Jan H. Silbaugh
Assistant Examiner—Mary Lynn Fertig
Attorney, Agent, or Firm—Walter A. Hackler

[57] ABSTRACT

Apparatus for producing relatively large and dense, relatively dry sulfur particles from molten sulfur comprises a manifold having a number of small, spaced apart, molten sulfur discharge apertures which are sized, according to the rate and pressure head at which the molten sulfur is received, for enabling the sulfur flow from each aperture to be laminar. Included is a vessel for holding a quenching liquid, preferably water. The manifold is mounted above the vessel with the discharge apertures preferably about one quarter inch to about two inches above the quenching liquid surface. Means are included for continuously moving the manifold in a circular path while the moltlen sulfur is discharged from the manifold apertures so that the discharged streams continually contact different regions of the quenching liquid. A conveyor is connected to the vessel for removing particulate sulfur therefrom. Three stages of quenching liquid removal are provided, the first comprising a screen element, the second comprising a porous conveyor belt with an air blower, and the third comprising a conveyor belt with another air blower. Means are provided for adding quenching liquid into the vessel, without distrubing the liquid in the vessel, to maintain a constant liquid operating level in the vessel level. A sulfur recycling stage is provided to recycle sulfur particles which fall off the porous conveyor belt without being delivered to the third stage belt back to the porous belt.

77 Claims, 3 Drawing Sheets

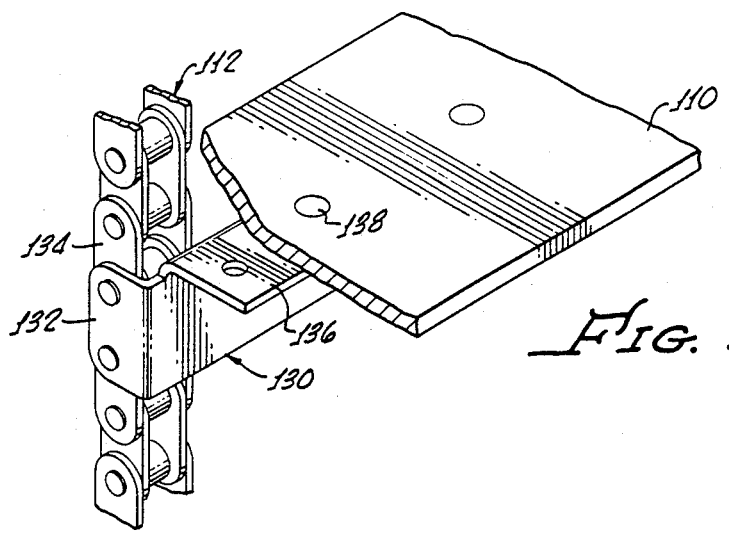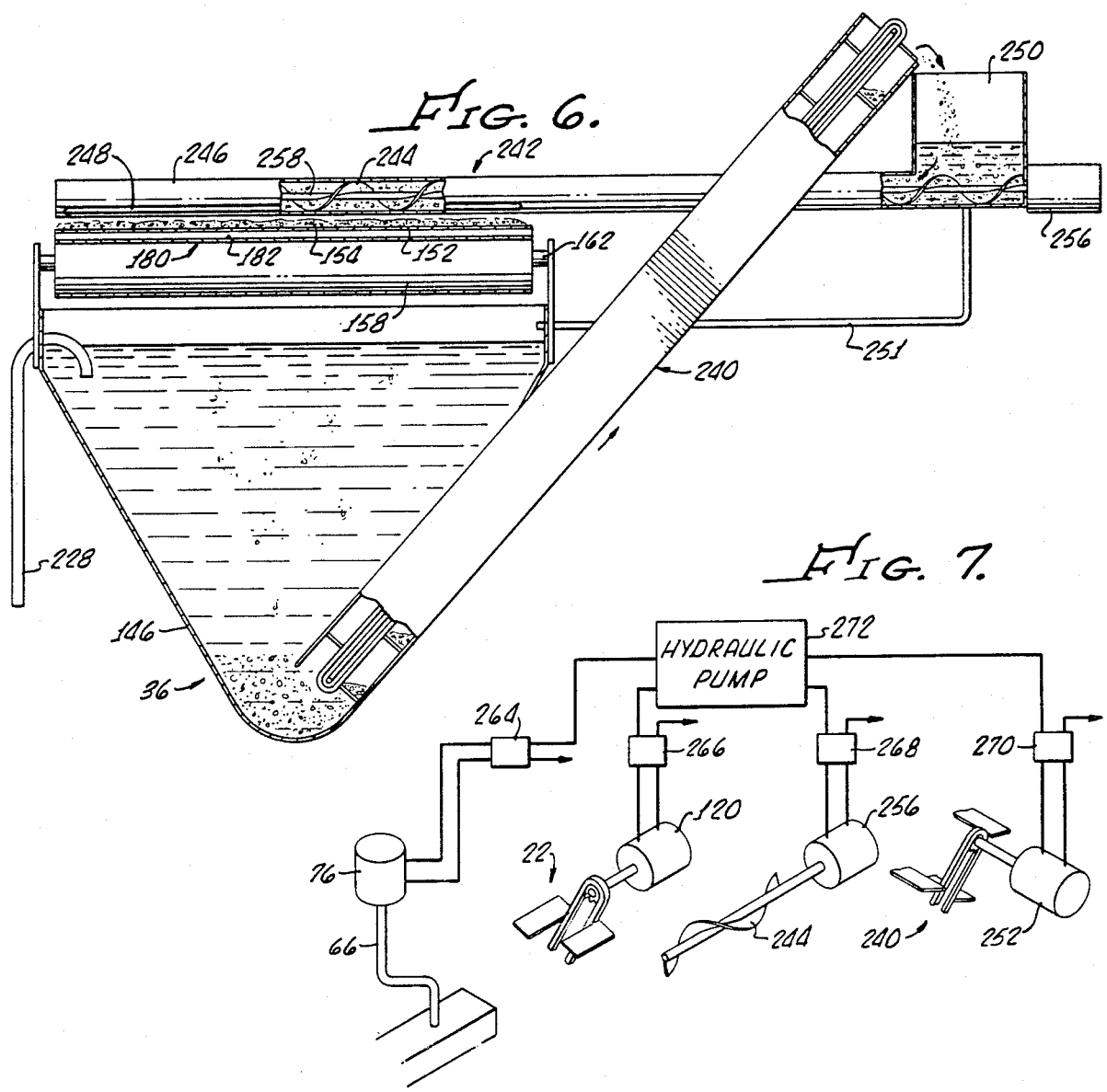

APPARATUS AND PROCESS FOR PRODUCING PARTICULATE SULFUR

BACKGROUND OF THE INVENTION

1. Field of the Invention

The present invention relates generally to apparatus and processes for producing particulate sulfur from molten sulfur and more particularly to apparatus and processes for producing relatively large and dense sulfur particles having a relatively low water content.

2. Discussion of the Background:

Sulfur, which is widely distributed in nature, is often considered, along with salt, coal and limestone, as being one of the four basic raw materials of the chemical industry. Important uses for sulfur include: acids and chemicals, agriculture, petroleum refining, ammonium sulfate, pulp and paper, textiles and rubber. Sulfur is produced commercially either as naturally occurring, "native," sulfur or as "recovered" sulfur which is a byproduct of many industrial processes, including the desulfurization of natural gas, crude petroleum, tar sands, oil shale, coal and geothermal fluids. Presently about as much recovered sulfur as native sulfur is produced.

One of the most important end uses of sulfur is for fertilizers and soil conditioners in agriculture, about half of all the sulfur produced being used for this purpose. In this regard, sulfur is essential to life, and all sulfur requirements for human and animal nutrition come from foods. The ultimate source of sulfur in food is soil from which sulfur is absorbed by plants as sulfate ions. Within plants, the sulfate ions are transformed into complex organic sulfur compounds which then enter the food chain. As an illustration of the importance of sulfur, protein, which is an essential constituent of all living cells and is required for building new tissue and replacing old tissue, is synthesized from such sulfurcontaining amino acids as methinone and cystine; other essential sulfur-containing substances are hormones and enzymes, as well as vitamin $B_1$.

In addition to correcting sulfur deficiencies affecting plant growth, sulfur and/or its compounds are applied directly to soil for soil conditioning purposes such as correcting soil alkalinity, reacting with soil so that the soil releases other nutrient elements needed by plants, and acting as a soil ameliorant. Sulfur, usually in the form of organic matter and sulfates, also improves soil structure, increases its water-holding capacity, modifies soil reaction, and stimulates the growth of soil microorganisms. Indirectly, sulfuric acid made from sulfur is used to treat phosphate rock in the production of phosphate fertilizer materials for plant use.

Sulfuric acid also has a great many other uses, such as in oil refining and the making of dyes, pigments, textiles and plastics. Because sulfuric acid is so widely used and is one of the most versatile inorganic chemical known, about 80 to 85 percent of all sulfur consumed is first converted to (or produced as) sulfuric acid.

Largely because it is usually produced in liquid form, about ninety percent of all sulfur transported within the continental United States is shipped in the molten state. However, before sulfur can be used for many domestic purposes and especially for exporting, the molten sulfur needs to be converted to solid, generally particulate, sulfur. A number of different processes are known whereby molten sulfur is converted into solid particles. For example, in the "slate" process, molten sulfur is poured into large, thin layers, frequently in a continuous manner on conveyor belts. When cooled and solidified, the resulting thin "slates" of sulfur are mechanically crushed to produce particles in the desired size range. Equipment for sulfur slating processes is relatively expensive, although the sulfur produced in this manner is generally dry.

As disclosed, for example, in U.S. Pat. No. 4,389,356 to J. T. Higgins, sulfur prills (small pellets) are produced by discharging molten sulfur through small nozzle orifices located at the top of a prilling tower, the prills being formed as the sulfur droplets cool and solidify while falling through the air. The Higgins patent also discloses vibrating the sulfur discharge nozzles and the use of a counter-flow of cooling air. Sulfur prills may also be formed by cooling and solidifying the sulfur droplets from a prilling nozzle in water instead of air, as disclosed in U.S. Pat. No. 3,334,159 to Campbell. In general sulfur prills tend to be quite small in size and fairly light in weight.

U.S. Pat. No. 3,830,631 to D. C. Young et al. alternatively discloses the production of sulfur particles by spraying pressurized molten sulfur from a nozzle. The resulting molten sulfur stream is typically broken up into droplets by impinging water jets, which also cool and solidify the droplets. As a still further example, U.S. Pat. No. 4,595,350 to B. Harbolt et al. discloses the production of sulfur particles by discharging a thin sheet of molten sulfur downwardly into the path of water jets which disperse the sulfur into droplets which then solidify into particles.

These and other known processes produce, or may produce, particulate sulfur which is suitable for such purposes as agricultural use. However, for various reasons related to sulfur particle size, density and water content and the cost of the required processing equipment, these known processes either may not produce a sulfur product which is satisfactory for the substantial sulfur export market or may not be economical for relatively small sulfur producers to use for such market.

In this regard, the export market for particulate sulfur differs substantially from the domestic, largely agricultural, market for particulate sulfur. By way of explanation of this difference, sulfur, when exposed to air, is rapidly oxidized to sulfate ions (which is the dominant form absorbed by higher plants) by various sulfur-feeding microorganisms, such as chemoautotropic bacteria of the genus Thiobacillis, heterotropic bacteria, fungi and actinomycetes. Consequently, small, light weight sulfur particles, which collectively have a large surface area per unit weight and volume, are favored for direct agricultural use because such particles provide a large surface area upon which such microorganisms can feed.

A side effect is that the sulfate ions produced by sulfur-feeding organisms in time react with the water usually present in water-produced particulate sulfur to form sulfuric acid. Such formation of sulfuric acid is usually not a serious problem for particulate sulfur produced for domestic agricultural use because the sulfur is generally not stockpiled long enough for significant amounts of sulfuric acid to form. Moreover, any sulfuric acid which does form is not detrimental for agricultural purposes. Nevertheless, even for domestic, agricultural use, some water removal to limit the amount of sulfuric acid formed during storage may be desirable if the product is excessively wet as produced.

For the export market, however, small and/or porous, wet sulfur particles, which tend to produce sulfuric acid, are very undesirable. Often particulate sulfur is produced from a tank truck load of molten sulfur and, at least for small producers, the accumulation of ship load quantities of particulate sulfur may take several weeks or months. If the product being stockpiled has a large surface-to-volume ratio and is even fairly wet, appreciable amounts of sulfuric acid may be formed during storage. When the sulfur particles are stockpiled on concrete floors (as is most often the case), the sulfuric acid so formed attacks and damages the concrete. As a result, when the sulfur is later scooped off the concrete for shipping, some of the dissolved concrete material is unavoidably scooped up with the sulfur and causes undesirable product contamination. Furthermore, during shipboard transit to overseas destinations, any sulfuric acid present will cause corrosion of metal storage areas. Shipping surcharges which are applied to cover such corrosion damage to ships obviously affect the selling price and even the marketability of the product.

Apart from the sulfuric acid problem, particulate sulfur having a high water content is undesirable for export because buyers neither want to buy the water at the price paid for the sulfur nor pay the further cost of shipping the water. As a result, a surcharge is also generally applied to sulfur having a water content of more than about 0.5 percent (typical export standards require no more than about 2.0 percent water content). Since water content of sulfur particles is largely attributable to water adhering to particle surfaces, it is desirable for this reason alone that the total combined surface area of the particles for a given product weight or volume be made as small as is economically practical.

To otherwise reduce shipping costs which in turn affect selling price, the particulate sulfur should have a relatively high bulk density to thereby minimize the shipping volume. Moreover, more dense sulfur particles tend to be relatively non-porous and therefore generally enable a dryer product which, as above-mentioned, favorably affects shipping costs. Still further, dense sulfur particles generally provide less surface area for a given volume or weight and therefore, with the reduced water retention, typically result in a further reduction in the amount of sulfuric acid formed during stockpiling because of a lower sulfate ion production rate.

Thus, for at least the export market, particulate sulfur should have: (i) a relatively high bulk density, (ii) a relatively low surface area for a given weight or volume, and (iii) a relatively low water content. Moreover, it is apparent that any improved apparatus and processes for producing such an advantageous product should be economical to the extent that the produced sulfur can be competitively priced for the export market. The present invention is, therefore, principally directed to an economical apparatus and process for producing particulate sulfur having such desirable characteristics, not only for the export market but for other markets in which some or all of these characteristics may be advantageous or desirable.

SUMMARY OF THE INVENTION

Apparatus for producing relatively large and dense sulfur particles comprises a vessel for holding a quenching liquid and a sulfur discharge nozzle or orifice manifold through which one or more laminar streams of molten sulfur are flowed into quenching liquid contained in the vessel. The nozzle or manifold is mounted relative to the vessel so that the laminar flow stream or streams of molten sulfur are flowed from a distance, preferably between about ¼ inch and about 8 inches, and more preferably between about ¼ inch and about 2 inches, above the a liquid operating level in the vessel. The preferred apparatus importantly includes means for moving the nozzle or manifold in a circular path as the molten sulfur is discharged therefrom, the path preferably having a radius of at least about 4 inches.

Preferably the quenching liquid is essentially water and should, in any event, have a specific gravity less than that of molten sulfur.

Means are provided for removing from the vessel sulfur particles formed when the laminar flow stream or streams of molten sulfur contact the quenching liquid. Since the sulfur removing means, according to an embodiment of the invention, removes some of the quenching liquid from the vessel along with the sulfur particles, means are provided for removing most of the quenching liquid from the removed sulfur particles. Such quenching liquid removing means preferably comprise a screen element, onto which sulfur particles removed from the vessel are discharged and which drains much of the quenching liquid from the particles. Also included is a porous conveyor belt onto which the particles are received from the screen element. Further included is an associated blower mounted for blowing air onto and through the porous belt and the sulfur particles being conveyed thereby so as to blow quenching liquid off the surface of the particles.

Preferably there is also included a second conveyor belt positioned for receiving the sulfur particles from the porous conveyor and a second blower mounted for blowing air against the sulfur particles as they are transported by the second conveyor belt, for example, to a storage area. This second blower is advantageous when the quenching liquid is water, the blown air evaporating surface water from the sulfur and providing a sulfur product preferably having a water content of less than about five weight percent.

According to an embodiment of the invention, means are included for collecting the quenching liquid removed from the particles by the screen element and porous conveyor belt and for collecting sulfur particles which fall from the porous belt without being discharged onto the second belt and for recycling the collected particles back onto a receiving end region of the porous belt. Means may further be provided for introducing quenching liquid, or fresh water when the quenching liquid is water, into the vessel at a rate maintaining the liquid in the vessel at a liquid operating level and in such a manner that the liquid or water already in the vessel remains quiescent.

Corresponding particulate sulfur producing processes are provided.

DESCRIPTION OF THE DRAWINGS

The present invention can be better understood from the following detailed description when taken in conjunction with the accompanying drawings in which:

FIG. 5 is perspective drawing showing the manner in which paddle blades (110) of the sulfur-removing conveyor (106) are connected to a drive chain (134);

FIG. 6 is a transverse cross sectional view, taken along line 6—6 of FIG. 1, showing features of the sulfur recycling stage (36); and FIG. 7 is a schematic drawing of a hydraulic system which is connected for operating various motors (76, 120, 268 and 270) included in the apparatus.

DESCRIPTION OF THE PREFERRED EMBODIMENT

Figure 1:
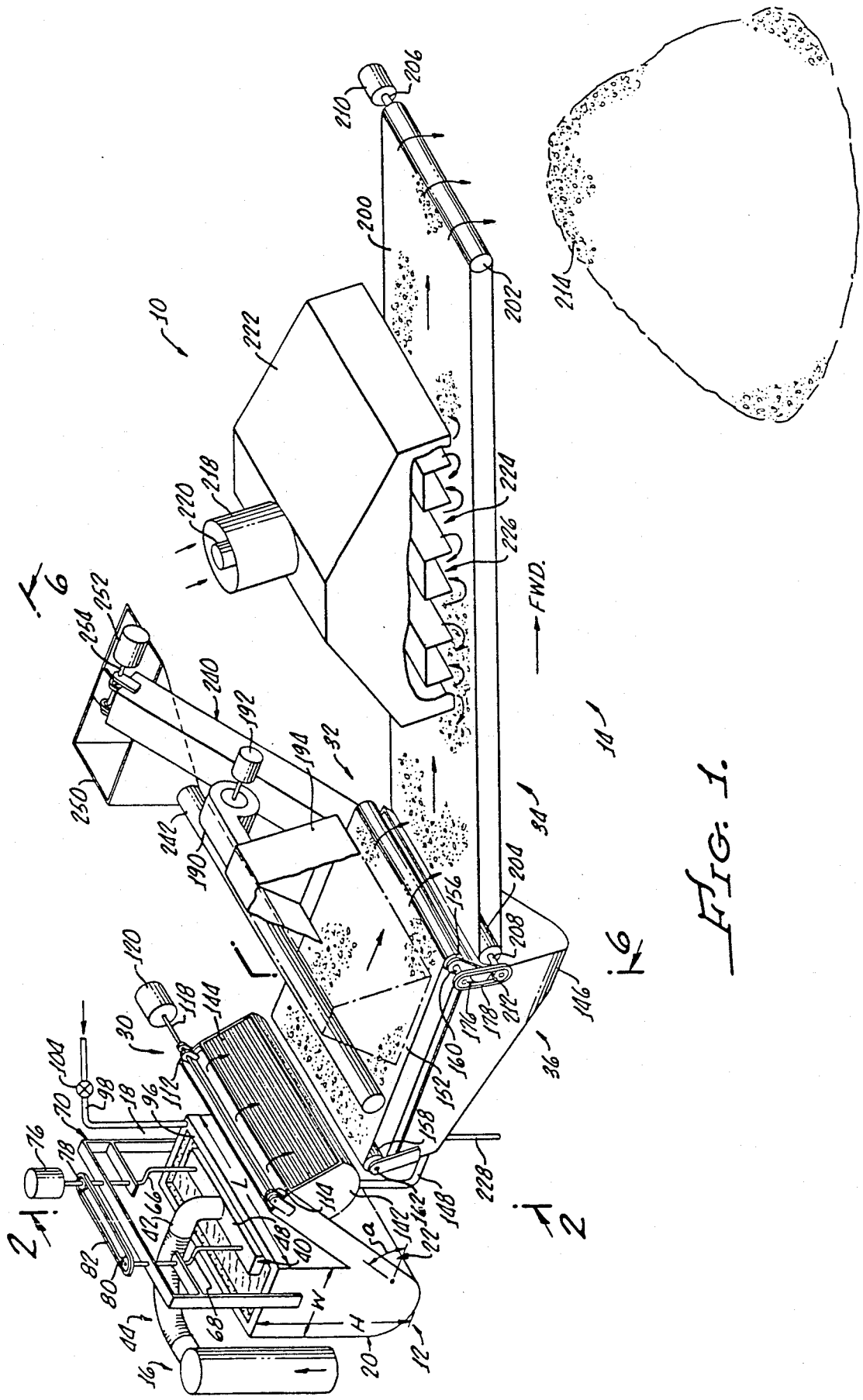
FIG. 1 is a perspective drawing of the sulfur particle production apparatus (10) of the present invention, showing an exemplary layout of major parts of the apparatus, including a molten sulfur discharge manifold (40), an associated quenching vessel (72), dewatering stages (30, 32 and 34) and a sulfur particle recycling stage (36)

Sulfur particle producing apparatus 10, according to the present invention and as depicted in FIG. 1, comprises generally a sulfur particle production portion 12 and a sulfur particle drying or quenching liquid removing portion 14. Generally comprising sulfur particle production portion 12 are molten sulfur supply means 16, molten sulfur discharge or introducing means 18, quenching means 20 and particulate sulfur removing means 22. Sulfur particle drying means 14, in turn, generally comprises respective first, second and third quenching liquid or water removal (assuming that water is the quenching liquid) stages 30, 32 and 34 and sulfur particle recycling means 36.

Molten sulfur supply means 16 provides a supply of molten sulfur to discharge means 18 in a steady flow manner and at a uniform pressure head, which may be about one foot of sulfur. In this respect, it is preferred, but not necessary, that molten sulfur supply means 16 comprise the molten sulfur lift apparatus disclosed in the abovereferenced U.S. Pat. No. 4,595,350, which is hereby incorporated by specific reference in its entirety.

Figure 2:
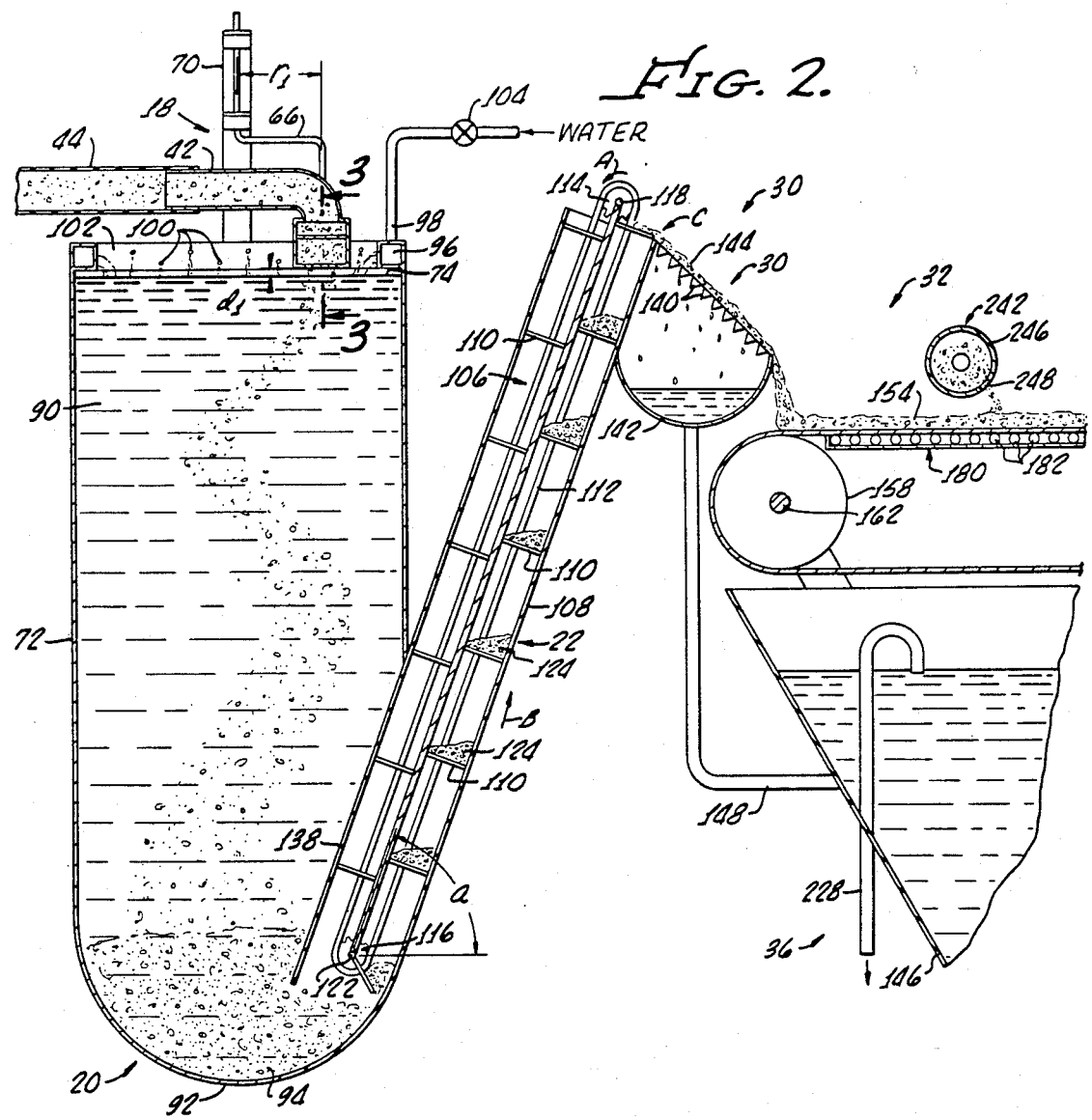
FIG. 2 is a cross sectional view taken along the direction of line 2—2 of FIG. 1 showing features of the quenching vessel (72), the manifold (40) through which molten sulfur in introduced into quenching liquid in the vessel and means (22) for removing solidified sulfur particles (94) from the bottom of the vessel.

Molten sulfur discharge means 16 are configured and operative for flowing one or more laminar streams of molten sulfur into quenching means 20 in such manner that relatively large, dense sulfur particles are formed as will be hereinafter described. As shown in FIGS. 1 and 2, discharge means 16 comprise a discharge manifold 40 which is connected to supply means 16 by a conduit 42 having a flexible elbow section 44.

Figure 3:
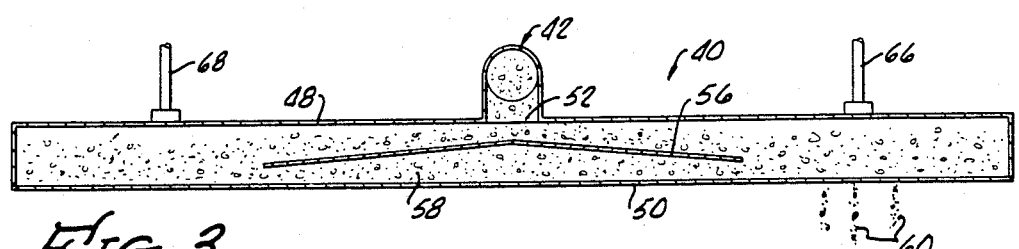
FIG. 3 is a cross sectional view taken along line 3—3 of FIG. 2 showing the internal construction of the manifold (40) through which molten sulfur is introduced into the vessel (72)
Figure 4:
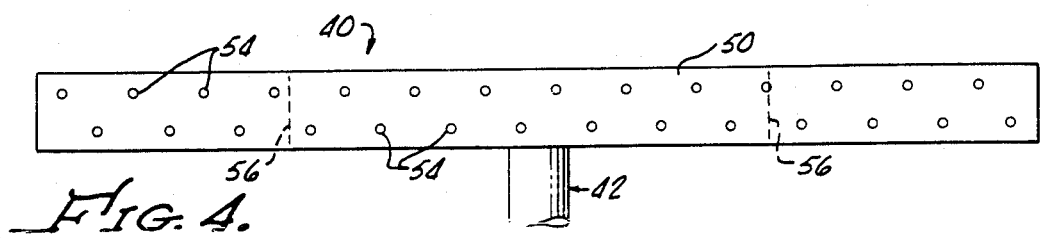
FIG. 4 is a bottom view of the manifold (40) of FIG. 3, showing a staggered arrangement of molten sulfur discharge apertures (54)

For the particular embodiment shown, manifold 40 comprises an elongate, closed structure having a square transverse cross section (FIG.2) and having top and bottom plates 48 and 50, respectively (FIG. 3). Top plate 48 is formed having a large, molten sulfur inlet aperture 52 in a central region, conduit 42 being connected to the top plate at such aperture. A relatively large number of small, spaced apart, molten sulfur discharge apertures 54 (FIG. 4) are formed in bottom plate. The number and size of sulfur discharge apertures depend upon the rate at which molten sulfur is fed to manifold 40 through conduit 44 and are advantageously selected to cause the flow of molten sulfur from each of the apertures to be laminar rather than turbulent.

A longitudinal, molten sulfur baffle or flow diverting element 56 is mounted inside manifold 40. Baffle 56, which is about half the length of manifold 40 and is slightly peaked, extends across the full width of the manifold and is centered beneath top plate aperture 52 (FIG. 3) so as to divide the incoming flow of molten sulfur 58 from conduit 42 and distribute the molten sulfur relatively evenly to all bottom plate discharge apertures 54.

Similar first and second crankarms 66 and 68, respectively, are rotatably mounted to a frame assembly 70 in a longitudinally spaced apart and mutually parallel relationship. Frame assembly 70 is, in turn, fixed to a vessel 72 comprising quenching means 20 (FIG. 1). Lower, radially offset ends of crankarms 66 and 68 are rotatably mounted to manifold top plate 48 near the ends thereof (FIG. 3). The length of crankarms 66 and 68 and their mounting location on frame assembly 70 are selected so that, during steady state operation, manifold bottom plate 50 is spaced a preestablished distance, $d_1$, above a fluid surface 74 in vessel 72. Such spacing, $d_1$, may, for example, be between about ¼ inch and about 8 inches and is preferably between about ¼ inch and about 2 inches.

A drive motor 76 is connected to first crankarm 66 for causing rotation thereof (FIG. 1). Fixed respectively to crankarms 66 and 68 are sprockets 78 and 80 over which a drive chain 82 is entrained. Both crankarms 66 and 68 are thereby caused to rotate in unison by motor 76 and, as a result, manifold 40 is caused to move along a circular path of radius, $r_1$, determined by the crankarm offset (FIG. 2). Radius, $r_1$, may, for example, be at least about 4 inches and is preferably between about 4 and about 8 inches. Each molten sulfur discharge aperture 54 in manifold bottom plate 50 is thereby also caused to move along a different circular path, each having the same radius, $r_1$. Such aperture rotation as molten sulfur is discharged enables molten sulfur streams 60 discharged from the apertures to contact, in a continuous manner, different regions of quenching liquid 90 in vessel 20. This method of introducing molten sulfur into quenching liquid 90 has been determined by the present inventors to be especially advantageous in causing the formation of relatively large and dense sulfur particles by the quenching action of liquid 90 on molten sulfur flow streams 60 from manifold apertures 54.

Vessel 72 is generally of rectangular cross section, but has a semi-cylindrical bottom region 92 into which particulate sulfur 94 formed in the vessel settles. The volume of vessel 72 depends principally upon the rate at which molten sulfur is introduced into the vessel through manifold 40 and the necessity to provide good molten sulfur quenching. Vessel 72 preferaby has a sufficient volume that the quenching liquid in lower regions of the vessel is not greater than about 175° F. An exemplary vessel size is given below with regard to a specific molten sulfur discharge rate and configuration of manifold.

Since some quenching liquid 90 is removed from vessel 72 along with particulate sulfur by sulfur removing means 22, means are provided for adding replacement quenching liquid to vessel 72 at the rate at which the liquid is removed (and/or evaporates). This addition of quenching liquid maintains liquid surface 74 at a constant, preselected level, as is necessary to maintain the preestablished spacing, $d_1$, between manifold bottom plate 50 and the liquid surface 74. Also, it has been determined by the present inventors that the replacement quenching liquid should be added to vessel 72 in a manner causing little or no disturbance to the quiescent quenching liquid already in the vessel. Accordingly, a quenching liquid inlet manifold 96, to which a quenching fluid feed conduit 98 is connected, is installed around the inside of vessel 72 at the top thereof (FIGS. 1 and 2). A large number of small discharge apertures 100 are formed in an inwardly directed face 102 of manifold 96 so that quenching liquid is discharged quietly into vessel 72 all around the inner periphery thereof. The flow of quenching liquid from conduit 98 into manifold 96 is regulated by a flow control valve 104 which may be manually controlled or controlled by a float (not shown) in vessel 72 in a conventional manner.

Means 22 for removing particulate sulfur 94 from bottom region 92 of vessel 72 preferably comprises a ladder-like conveyor 106 which extends downwardly through a liquid-tight housing 108 which forms a generally rectangular extension or arm of vessel 72 and extends the length, L, and beyond the height, H, thereof (FIGS. 1 and 2) at an angle, a, of preferably between about 45° and about 70°.

Conveyor 106 comprises a number of long, narrow, rectangular blades which extend between and are connected to two parallel, spaced apart conveyor chains 112 entrained over respective upper and lower sprockets 114 and 116. Upper sprockets 114 are fixed to a drive shaft 118 to which is connected a drive motor 120 (FIG. 1); lower sprockets 116 are fixed to an idler shaft 122 (FIG. 2). The counterclockwise rotation of drive shaft (direction of Arrow A, FIG. 2) by motor 120 causes each blade 110 on the advancing side of conveyor 106 to convey (in the direction of arrow B) a small pile 124 of sulfur from vessel bottom region 92 to a discharge point C. As above-mentioned, some quenching fluid is discharged with the sulfur at point C.

By way of example and as shown in FIG. 5 for a representative blade, each blade 110 may be connected to and between conveyor chains 112 by a rigid angle member 130. Bent over end tabs 132 on each angle member 130 are connected to links 134 of both chains 112 and a blade 110 is attached to one leg 136 of each angle member by rivets or bolts 138.

As shown in FIG. 2, an upper surface region 138 of conveyor housing 108 extends at an angle downwardly into vessel 72 to cover the return side of conveyor 106. A rigid sheet (not shown) extends between upper and lower shafts 118 and 122, respectively, to separate the discharge and return sides of conveyor 106.

First quenching liquid removing stage 30 comprises a downwardly inclined screen element 140 having a liquid catch tank 142 mounted therebelow (FIGS. 1 and 2). As the sulfur discharged at point "C" from conveyor 106 slides down screen element 140 in a relatively thin, wide sheet 144, much of the quenching liquid entrained with the sulfur and/or held onto the surface of the particles by surface tension drains through the screen element and into catch tank 142. Catch tank 142 drains into a recycling tank 146 (more particularly described below) through a conduit 148.

Included in second quenching liquid removing stage 32 is a wide, comparatively short, porous conveyor belt 152 onto which particulate sulfur is discharged, in a relatively thin sheet 154, from first stage 30 (FIGS. 1 and 2). Porous belt 152 is entrained over respective forward and rearward rollers 156 and 158 which are mounted on respective shafts 160 and 162. Rearward roller 156 is an idler roller and forward roller 158 is the belt drive roller, shaft 160 on which the forward roller is mounted being driven, through a drive sprocket 176 fixed thereto, by a drive chain 178 from third quenching liquid removing stage 34, as described below. Upper regions of porous conveyor belt 152 are supported by an open framework 180 (FIG. 2) comprised of a number of closely spaced, belt wiper rods 182 (FIG. 2) arranged in a chevron pattern.

Further comprising second quenching liquid removing stage 32 is an ai blower 190 which is driven by an electric motor 194 (FIG. 1). A diverging air duct 192, mounted above porous belt 152, is connected to blower 190 for directing air therefrom downwardly onto the belt and onto sulfur layer 154 being transported thereon. Blower 190 is therefore operative for blowing quenching liquid from the sulfur down through pores in belt 152. From belt 152, the removed liquid falls into recycling tank 146 which is located below the belt. Rods 182 of belt supporting framework 180 act as wipers to remove quenching liquid from the underside of belt 152 as the belt slides thereover during operation.

Third quenching liquid removing stage 34 comprises a long, wide, generally conventional fabric conveyor belt 200 onto which sulfur particles are discharged from porous belt 152 of second stage 32, the belts therefore overlapping slightly (FIG. 1). Conveyor belt 200 is entrained over respective forward and rearward rollers 202 and 204, which are mounted on respective forward and rearward shafts 206 and 208. An electric drive motor 210 is connected to forward shaft 206. Drive chain 178 which drives porous conveyor belt 152, as described above, is entrained over a drive sprocket 212 fixed to rearward shaft 208. Drive motor 210 therefore operates both conveyor belts 200 and 152 in unison. Conveyor belt 200 discharges the dried sulfur onto a particulate sulfur stockpile 214.

Assuming that the sulfur quenching liquid can be evaporated, such as is the case for the liquid being water, third stage 34 includes a second, evaporative air blower 218, driven by an electric motor 220 (FIG. 1). Blower 218 is connected to a diverging air duct 222 mounted above conveyor belt 200. Duct 222 is constructed to have several longitudinally spaced apart, transverse air discharge outlets 224 which define therebetween several transverse air passageways 226 for the escape of air and evaporated quenching liquid from the sulfur. Whereas the removal of quenching liquid from the sulfur particles in second stage 32 is principally by a stripping action in which the liquid is blown from the sulfur, the removal of quenching liquid in third stage 34 is principally by an evaporation process.

Sulfur discharged from conveyor belt 200 onto stockpile 214 preferably has a low content of quenching liquid. Assuming that the quenching liquid is water (or essentially water), the water content of the sulfur particles discharged from conveyor belt onto stockpile is preferably no more than about 5 percent. The quenching liquid content of the produced sulfur particles depends upon such factors as the sulfur production rate, the size of the sulfur particles, the sulfur transit time on belts 152 and 200, the thickness of the sulfur on the belts and the amount and temperature of air provided by blowers 190 and 218, As above-described, tank 146 (FIGS. 1 and 2), which has been referred to as a recycling tank since it comprises part of recycling means 36, is provided to collect the significant amounts of quenching liquid removed from the sulfur particles in first and second quenching liquid removing stages 30 and 32. A standpipe 228 is provided in and through tank 146 to prevent overflow of the tank (FIG. 2).

If the quenching liquid drained into tank 146 has any significant cost, it may be recycled from the tank, through conduit 98, back into quenching vessel 72 for reuse. However in the case of water, which is the preferred quenching liquid, it has been discovered by the present inventors that the quality of sulfur particles produced when water is recycled from tank 146 is poorer than when fresh "make up" water is added to vessel 72 through conduit 98, even though the recycled water appears to analyze the same as the fresh water. The recycling of quenching water from tank 146 back to vessel 72 is, therefore, not preferred, although, it is within the scope of the invention to do so. If the quenching water contains additives which are intended to be adsorbed onto the produced sulfur, it may be desirable to recycle the collected water plus additives; if so, it is preferred that the recycled liquid (or any fresh additives) be added into lower regions of vessel 72, rather than through conduit 98 and manifold 96.

Although it is preferred that the quenching liquid be water or essentially water, the invention is not limited thereto. However, it is, of course, preferred that whatever liquid is used as a quenching liquid have a specific gravity which is less, and preferably substantially less, than that of liquid sulfur (which is 1.811 grams per cubic centimeter). Irrespective of the quenching liquid used, it may be beneficial for the production of relatively dense and large sulfur particles to add only fresh quenching liquid through conduit 98 and manifold 96 or, if the liquid is to be recycled from tank 146, to add the recycled liquid into lower regions of vessel 72.

It has also been discovered that although the use of porous belt 152 is advantageous for the purpose of removing quenching liquid from the particulate sulfur produced in vessel 72, some of the particulate sulfur adheres to the belt and is carried around to the under, return region of the belt instead of being discharged onto belt 200 as intended. Most of these particles fall off from belt 152 into recycling tank 146, assuming that such tank is installed beneath the belt. A sufficient amount of sulfur particles is discharged from belt 152 in this manner to make recycling of the particles desirable. To this end, recycling means 36 further comprise a conveyor 240 for removing particulate sulfur from bottom regions of tank 146 and spreading means 242 for distributing the sulfur particles removed from the tank by the conveyor back onto the receiving end region of belt 152 (FIG. 6).

Conveyor 240 is preferably a narrow version of removing means 22 which was described above. Also the relationship between conveyor 240 and recycling tank 146 is preferably the same as the above-described relationship between sulfur removing means 22 and quenching vessel 72. Therefore, no further description of this portion of recycling means 36 is considered necessary.

Sulfur distributing means 242 comprise an elongate, screw-type conveyor rotatably disposed in a tubular housing 246 which is, in urn, mounted transversely across and just above porous belt 152 (FIGS. 2 and 6). Housing 246 is provided, along the portion of its length which is above belt 152, with a variable-width slot 248 through which sulfur particles being conveyed by conveyor screw 244 are distributed onto the belt 152. A hopper 250 is provided into which sulfur particles removed from tank 146 are discharged by conveyor 240 and from which the particles are conveyed by screw 244 for discharging onto belt 152. Hopper 250 may include a screen element (not shown), similar to screen element 140 for the draining of quenching liquid discharged by conveyor 240 with the particulate sulfur. Hopper 250 may, accordingly, drain back into tank 146 through a conduit 251.

A drive motor 252 is connected to a shaft 254 for driving conveyor 240. Another drive motor 256 is connected to a shaft 258 to which screw 244 is mounted for driving the screw (FIG. 6).

To enable "fine tuning" of apparatus 20 during operation, it is preferred that various of the motor drives used in the apparatus be easily controlled as to speed. Therefore, as shown in FIG. 7, motor 76 driving discharge manifold crankarm 66, motor 120 driving sulfur removing means 22, motor 252 driving, recycled, sulfur conveyor 240 and motor 256 driving the screw 244 may be hydraulic motors which are connected, through respective control valves 264, 266, 268 and 270, to a hydraulic pump 272 in a known manner. Speeds of the associated motors are controlled by valves 264, 266, 268 and 270 either manually or electrically according to the types of control valves used.

EXAMPLE:

By way of example, with no limitations being thereby intended or implied, apparatus 20 is configured as described below for a molten sulfur processing rate of about 38–40 short tons per hour (based upon processing a tank truck load of about 25–26 short tons in about 40 minutes). For such a processing rate of molten sulfur, and for a positive pressure head of about one foot of liquid sulfur, sulfur discharge manifold 40 (FIGS. 3 and 4) is about 52 inches long and about $3\frac{1}{2}$ inches square and is preferably made out of 0.120 inch thick stainless steel. Twenty-eight (28) apertures 54, each preferably between about $\frac{1}{4}$ inch and about $\frac{3}{4}$ inch, and more preferably about $\frac{1}{2}$ inch, in diameter, are formed in manifold bottom plate 50 in two staggered rows of 14 apertures each, with the apertures on 3 inch centers. The two rows of apertures are laterally spaced apart about 2 inches (centerline-to-centerline). Manifold motor 76 preferably drives manifold 40 at between about 6 RPM and about 60 RPM, and more preferably at under about 12 RPM, through crankarm 66 (FIG. 1). As mentioned above, the radius, $r_1$, of rotation, defined by the offset of crankarms 66 and 70 is between about 4 inches and about 6 inches and the spacing, $d_1$, of manifold bottom plate 50 above quenching surface 74 is preferred to be between about $\frac{1}{4}$ inch and about 2 inches.

Assuming the use of water or essentially water as a quenching liquid, the height, H, of vessel 72 may be about $6\frac{1}{2}$ feet (providing a liquid depth of about 6 feet), width, W, of the vessel may be about 2 feet and length, of the vessel may be about 6 feet. Sulfur removing means 22 are about 6 feet high, about 7 feet long (in the direction of dimension, L, of vessel 72) and about 1 foot wide, the vessel 72 and sulfur removing means 22 have a combined water capacity of about 852 gallons. Replacement water is added to vessel 72 through conduit 98 and manifold 96 at a rate of about 60 gallons per minute to maintain a constant liquid operating level in the vessel during steady state operation of apparatus 10. The steady state temperature in vessel 72, near the bottom of the vessel, is typically between about 155° F. and about 175° F.

Sulfur removing means 22 is preferably connected through vessel 72 at an angle, a, from the horizontal which is about 70° (FIGS. 1 and 2). Conveyor blades 110 are about 3 inches wide and about 6 feet long and are made of ¼ inch plastic. Spacing between blades 110 is between about 8 inches and about 10 inches. Sprockets 114 and 116 of the conveyor are about 2 inches in diameter. Moving means 22 move blades 110 at a speed of less than about 1 foot per second and preferably at a speed of about 5 inches per second.

Sulfur particles discharged from removing means 22 (at point "C") have been found to have about a 30 weight percent water content. Screen element 140 (FIGS. 1 and 2) is preferably a HYDRASIEVE ™ screen manufactured by the Spout-Bauer Company, P.O. Box 539, Springfield, Ohio 45501, and has the same length, L, as vessel 72 and is about 18–24 inches wide. Screening bars which comprise screen element 140 are about 1/16 to ⅛ inch wide and are spaced apart about 0.060 inches. Screen element 140 is preferably inclined at an angle of about 60° from the horizontal. As the sulfur particles complete their transit across screen element 140 and are discharged therefrom onto porous belt 152, the water content of the particles is typically reduced to about 10 weight percent.

Rollers 156 and 158 (FIG. 1) over which porous belt 152 is entrained are about 9 ½ inch in diameter and 6 feet long. Forward roller 156 is preferably made of rubber and rearward roller is preferably made of stainless steel. The center-to-center spacing between rollers 156 and 158 is about 10 feet 2 inches. Belt 152 is preferably a polyester filtration belt 68 inches wide and about 23½ feet long, having a water flow through rating of rating of 122 cubic feet per minute per square foot and retaining particles larger than about 120 to about 130 microns. Belt 152 can be obtained as Style No.XBA-H4C0CJ5 from AMETEK/PROCESS, El Cajon, Calif. The sulfur advancing speed of belt 152 is about 72 feet per minute. Sulfur layer 154 on belt 152 is between about ¼ inch and about 1 inch in thickness. Blower 190 provides about 5100 CFM of air at a velocity (measured at the surface of belt 152) of about 10 feet per second.

Conveyor belt 200 is a 3-ply, essentially non-porous fabric belt, 72 inches wide and about 60½ feet long, and is preferably a standard KOROSEAL model KIU-125 belt. Conveyor rollers 202 and 204 are similar to roller 156. Third liquid removing means 34 is preferably mounted at an upwardly inclined angle relative to a horizontal plane which is no greater than the angle of repose of the sulfur particles; this repose angle has been determined, for the particular sulfur particles made by the above-described apparatus, to be about 33°, the third liquid removing means being mounted at an angle of about 20°. Blower 218 provides about 16,500 CFM of air at a low velocity. Sulfur particles discharged from belt 200 onto stockpile 214 have a temperature of about 120° F. and a water content of about 5 percent. The bulk density of the sulfur particles is about 81 pounds per cubic feet and the majority of the particles are between about ⅛ inch and about 3/16 inch across, with many particles as large as about ⅜ inch across.

Although there has been described above a particular arrangement of an apparatus for producing particulate sulfur from molten sulfur, for which there is a corresponding production process, in accordance with the present invention for the purpose of illustrating the manner in which the invention can be used to advantage, it is to be appreciated that the invention is not limited thereto. For example, more or fewer sulfur discharge apertures 54 may be provided in manifoldbottom plate 50, and the spacing and arrangement, as well as the size, of such apertures may be varied. The rotational rate of crankarms 66 and 70 and the offset thereof may be increased or decreased. The speeds of conveyor 106 and belts 152 and 200 may be increased or decreased over those given by way of example and recycling means 36 may be omitted. Also, the number of molten sulfur discharge apertures 54 in manifold 40, as well as the diameter of the apertures, may be varied according to the feed rate of the molten sulfur into apparatus 10.

Accordingly, any and all variations and equivalent arrangements which may occur to those skilled in the art are to be considered to be within the scope and spirit of the present invention as defined in the appended claims.

What is claimed is:

1. Apparatus for producing relatively large, high bulk density sulfur particles from molten sulfer, the apparatus comprising:
   a. a vessel for holding a quantity of a liquid for quenching molten sulfer, said vessel having a quenching liquid operating level;
   b. means for introducing molten sulfur into liquid contained in said vessel in at least one substantially laminar flow stream at a rate and at a distance above said quenching liquid operating level, said rate and distance being such as to cause the laminar flow stream of molten sulfur to disperse into relatively large and dense particles upon contact with quenching liquid when the vessel is filled with quenching liquid to said operating level, said means comprising at least one molten sulfur discharge aperture and including means for moving said aperture along a horizontal path in a substantially continuous manner as molten sulfur is discharged therefrom to cause said at least one substantially laminar flow stream to contact with said quenching liquid in different regions; and
   c. means for removing the sulfur particles from said vessel.

2. The apparatus as claimed in claim 1, wherein the means for removing the sulfur particles from the vessel also removes quenching liquid from the vessel and including means for introducing a substantially continuous flow of quenching liquid into the vessel at a rate maintaining the liquid substantially at said operating level and in a manner maintaining quenching liquid already in the vessel in a quiescent state.

3. The apparatus as claimed in claim 2 wherein the means for introducing quenching liquid into the vessel are connected for introducing fresh water into the vessel.

4. The apparatus as claimed in claim 1 wherein the means for introducing at least one substantially laminar flow stream of molten sulfur into the vessel comprise a horizontally elongate molten sulfur discharge manifold having a number of spaced apart, discharge apertures defined in lower regions thereof, each of said apertures being sized relative to the total discharge rate of molten sulfur to discharge a substantially laminar flow stream of molten sulfur.

5. The apparatus as claimed in claim 4 including means for continually moving the discharge manifold in a horizontal plane as molten sulfur is discharged therefrom, so as to cause each of the discharge apertures to move along a separate circular path, all of said paths having substantially the same radius.

6. The apparatus as claimed in claim 1 including means for providing molten sulfur to the means for introducing molten sulfur into the vessel.

7. The apparatus as claimed in claim 6 wherein the means for introducing at least one laminar flow stream of molten sulfur into the vessel comprise a discharge manifold having between about 20 and about 30 spaced apart discharge apertures in a common horizontal plane, each of said apertures having a diameter of between about ¼ and about ¾ inch.

8. The apparatus as claimed in claim 7, wherein the means for providing molten sulfur are constructed for providing molten sulfur at a rate of at least about 30 short tons per hour and at a pressure head of at least about one foot of molten sulfur.

9. The apparatus as claimed in claim 1 wherein the means for removing sulfur particles from the vessel is constructed in a manner also removing some quenching liquid along with the sulfur particles and wherein the apparatus includes means for removing major amounts of said quenching liquid removed from the vessel with the sulfur particles from the removed sulfur particles removed, said quenching liquid removing means comprising a porous conveyor belt, means for depositing a comparatively thin layer of sulfur particles removed from the vessel by said removing means onto said belt and means for driving said belt in a direction transporting sulfur particles deposited thereon away from said vessel.

10. The apparatus as claimed in claim 9 wherein said means for removing quenching liquid from the sulfur particles include blower means disposed above the porous belt for blowing air through both the layer of sulfur particles on said belt and through said belt itself.

11. The apparatus as claimed in claim 10 wherein said means for removing quenching liquid from the sulfur particles include a second conveyor belt mounted in sulfur particle receiving relationship with respect to the porous conveyor belt and second blower means disposed above said second belt for directing a flow of air against sulfur particles on said second belt and further including means for driving said second belt in a direction causing sulfur particles thereon to be transported away from the porous belt.

12. The apparatus as claimed in claim 11 including a tank disposed beneath said porous belt for receiving therefrom removed quenching liquid and sulfur particles falling from said porous belt and for recycling said received particles from said tank back onto a particle receiving end region of said porous belt.

13. The apparatus as claimed in claim 9 wherein the means for removing quenching liquid from the particulate sulfur include initial liquid removing means disposed intermediate said sulfur particle removing means and said porous conveyor belt for draining a substantial amount of quenching liquid from the sulfur particles removed from the quenching vessel before the particles are deposited onto the porous belt.

14. The apparatus as claimed in claim 1 wherein the means for removing sulfur particles from the vessel comprise a conveyor having a number of spaced apart paddle blades, one end region of said conveyor being disposed in lower, sulfur particle accumulating regions of the vessel.

15. Apparatus for producing comparatively large, high bulk density sulfur particles from molten sulfur, the apparatus comprising:
   a. a vessel sized for continuing a substantial quantity of sulfur-quenching liquid having a density less than that of sulfur particles, said vessel having a quenching liquid operating level;
   b. means for introducing a plurality of parallel, spaced apart, substantially laminar flow streams of molten sulfur into said vessel at a rate and at a distance above said operating level, said rate and distance being such as to cause the molten sulfur from each of said streams to form into relatively large and dense particles upon contact with quenching liquid in the vessel when the vessel is filled to said operating level with quenching liquid said means comprising at least one molten sulfur discharge aperture and including means for moving said aperture along a horizontal-path in a substantially continuous manner as molten sulfur is discharge therefrom to cause said substantially laminar flow streams to each contact said quenching liquid in different regions;
   c. means for removing the formed sulfur particles as well as some quenching liquid from lower regions of the vessel; and
   d. means for removing most of the quenching liquid from the particles removed from the vessel by the removing means, said liquid removing means including first and second liquid draining means, said first draining means comprising a screen element over which wet sulfur particles are discharged from the vessel by the sulfur particle removing means onto the second draining means, the second draining means comprising a porous conveyor belt onto which the sulfur particles are discharged from the first draining means in a thin layer and including means for driving the porous conveyor belt in a direction transporting the sulfur particles away from said vessel.

16. The apparatus as claimed in claim 15, including means for providing, as molten sulfur is introduced into the vessel from the molten sulfur introducing means, a substantially continuous flow of quenching liquid into the vessel at a rate replacing quenching liquid removed from the vessel by the sulfur particle removing means and in a manner maintaining quenching liquid already in the vessel in a substantially quiescent state.

17. The apparatus as claimed in claim 16 wherein the means for providing quenching liquid into the vessel is connected for providing fresh water into the vessel.

18. The apparatus as claimed in claim 15 wherein the means for introducing a plurality of substantially laminar flow streams of molten sulfur into the vessel include a molten sulfur discharge manifold and means for moving said manifold along a horizontal path in a manner causing each of the streams of molten sulfur discharged from the manifold to move along a different circular path, each of which paths has substantially the same radius of at least about 4 inches.

19. The apparatus as claimed in claim 18 wherein the apparatus is constructed for receiving molten sulfur at a rate of at least about 30 short tons per hour and at a pressure head of at least about 1 foot of molten sulfur, and wherein said molten sulfur discharge manifold has between about 20 and about 40 discharge apertures in a common horizontal plane, each of said apertures having a diameter of between about ¼ inch and about ¾ inch.

20. The apparatus as claimed in claim 15 wherein the distance between the molten sulfur discharge aperture and the said operating level is between about ¼ inch and about 8 inches.

21. The apparatus as claimed in claim 15 wherein the means for removing quenching liquid from removed sulfur particles include blower means disposed above the porous belt for providing a flow of air through both a layer of sulfur particles on said belt and through said belt itself.

22. The apparatus as claimed in claim 21 wherein the means for removing quenching liquid from the removed sulfur particles include a second conveyor belt mounted in sulfur particles receiving relationship with respect to the porous conveyor belt and second blower means disposed above said second belt for blowing a flow of air against sulfur particles on said second belt and further including means for driving said second belt in a direction moving sulfur particles thereon away from the porous belt.

23. The apparatus as claimed in claim 22 including a tank disposed beneath the second liquid draining means for receiving removed quenching liquid therefrom and for receiving sulfur particles which fall from said second liquid draining means and including means for recycling said fallen sulfur particles back onto a particle receiving end region of said second quenching liquid removing means.

24. Apparatus for producing comparatively large, high bulk density sulfur particles from molten sulfur, the apparatus comprising:
   a. a vessel sized for containing a substantial quantity of sulfur quenching liquid having a density less than that of sulfur particles and having an operating liquid level;
   b. means for providing a supply of molten sulfur at a positive pressure head;
   c. a molten sulfur discharge manifold connected to said means of providing a supply of molten sulfur, said manifold having a plurality of spaced apart sulfur discharge apertures for flowing therethrough a like plurality of parallel, substantially laminar flow streams of molten sulfur into said vessel;
   d. means for mounting the manifold with the manifold discharge apertures above said liquid operating level on the vessel;
   e. means for moving said manifold in a horizontal plaen so that each of said discharge apertures traces out a similar path when molten sulfur is flowed therefrom into the vessel and to cause said substantially laminar flow streams to each contact said quenching liquid in different regions;
   f. means for removing from said vessel sulfur particles formed therein by the flowing of said streams of molten sulfur into quenching liquid in the vessel, said removing means also removing some of the quenching liquid from the vessel along with the sulfur particles; and
   g. means for removing most of the quenching liquid from the sulfur particles removed from said vessel.

25. The apparatus as claimed in claim 24, including means for introducing a substantially continuous flow of quenching liquid into the vessel at a rate maintaining the surface of said quenching liquid at said operating liquid level and in a manner such as to cause quenching liquid already in the vessel to remain in a substantially quiescent state.

26. The apparatus as claimed in claim 25 wherein the means for introducing quenching liquid into the vessel is connected for introducing fresh water into the vessel.

27. The apparatus as claimed in claim 24 wherein the apparatus is constructed for receiving molten sulfur at a rate of at least about 30 short tons per hour, and wherein the manifold is formed having between about 20 and about 40 molten sulfur discharge apertures in a common horizontal plane, each of said apertures having a diameter of between about ¼ inch and about ¾ inch.

28. The apparatus as claimed in claim 24 wherein the manifold is mounted so that the manifold discharge apertures are positioned between about ¼ inch and about 8 inches above said liquid operating level.

29. The apparatus as claimed in claim 24 wherein the manifold is mounted so that the manifold discharge apertures are positioned between about ¼ inch and about 2 inches above said liquid operating level.

30. The apparatus as claimed in claim 24 wherein the means for removing quenching liquid from the sulfur particles removed from the vessel comprises first and second liquid draining means, said first draining means comprising a screen element over which sulfur particles are discharged from the vessel by the sulfur particle removing means onto the second draining means, the second draining means comprising a porous conveyor belt onto which the sulfur particles are received in a thin layer and including means for driving the porous conveyor belt in a direction transporting the sulfur particles away from said vessel.

31. The apparatus as claimed in claim 30 including blower means disposed above the porous belt for providing a flow of air through both a layer of sulfur particles on said belt and through said belt itself.

32. The apparatus as claimed in claim 30 wherein the means for removing quenching liquid include a second conveyor belt mounted in sulfur particle receiving relationship with respect to the porous conveyor belt and second blower means disposed above said second belt for directing a flow of air against sulfur particles on said second belt and further including means for driving said second belt in a direction moving sulfur particles thereon away from the porous belt.

33. The apparatus as claimed in claim 30 including means disposed beneath the porous belt for receiving both quenching liquid drained from sulfur particles on said belt and sulfur particles falling from said porous belt without being discharged therefrom onto said second belt and including means for recycling the received fallen particles back onto a particle receiving end region of said porous belt.

34. Apparatus for producing comparatively large, high bulk density particles from molten sulfur, the apparatus comprising:
   a. a vessel;
   b. a quenching liquid having a specific gravity less than of liquid sulfur, said quenching liquid being connected in said vessel and filling said vessel to a liquid operating level;
   c. means for providing a supply of molten sulfur at a positive pressure head;
   d. a molten sulfur discharge manifold connected to said molten sulfur supply means, said manifold having a plurality of spaced apart sulfur discharge apertures for flowing therethrough a like plurality of parallel, substantially laminar streams of molten sulfur into said quenching liquid in the vessel;

e. means for mounting the manifold discharge apertures above the liquid operating level of quenching liquid in the vessel;

f. means for moving said manifold in a horizontal plane so that each of said discharge apertures traces out similar path when molten sulfur is flowed therefrom into quenching liquid in the vessel, and to cause said substantially laminar flow streams to each contact said quenching liquid in different regions;

g. means for removing from said vessel sulfur particles formed therein by the introducing of said streams of molten sulfur into said quenching liquid from the vessel along with the sulfur particles; and h. means for removing most of the quenching liquid from the sulfur particles removed from said vessel.

35. The apparatus as claimed in claim 34, including means for introducing a substantially continuous flow of quenching liquid into the vessel at a rate maintaining the surface of said quenching liquid therein at said operating liquid level and in a manner such as to cause the quenching liquid already in the vessel to remain in a substantially quiescent state.

36. The apparatus as claimed in claim 35 wherein the quenching liquid is essentially water and wherein the means for introducing quenching liquid into the vessel is connected for introducing fresh water into the vessel.

37. The apparatus as claimed in claim 34 wherein the sulfur supply means are capable of providing molten sulfur at a rate of at least about 30 short tons per hour, and wherein the manifold is formed having between about 20 and about 40 molten sulfur discharge apertures in a common horizontal plane, each of said apertures having a diameter of between about $\frac{1}{4}$ inch and about $\frac{3}{4}$ inch.

38. The apparatus as claimed in claim 34 wherein the manifold is mounted so that the manifold discharge apertures are between about $\frac{1}{4}$ inch and about 8 inches above the liquid operating level of the quenching liquid in the vessel.

39. The apparatus as claimed in claim 34 wherein the manifold is mounted so that the manifold discharge apertures are between about $\frac{1}{4}$ inch and about 2 inches above the liquid operating level of the quenching liquid in the vessel.

40. The apparatus as claimed in claim 34 wherein the means for removing quenching liquid from the sulfur particles removed from the vessel comprises first and second liquid draining means, said first draining means comprising a screen element over which sulfur particles are discharged from the vessel by the sulfur particle removing means onto the second draining means, the second draining means comprising a porous conveyor belt onto which the sulfur particles are received in a thin layer and including means for driving the porous conveyor belt in a direction transporting the sulfur particles away from said vessel.

41. The apparatus as claimed in claim 40 wherein the first liquid draining means include blower means disposed above the porous belt for providing a flow of air through both a layer of sulfur particles on said belt and through said belt itself.

42. The apparatus as claimed in claim 40 wherein the means for removing quenching liquid include a second conveyor belt mounted in sulfur particle receiving relationship with respect to the porous conveyor belt and second blower means disposed above said second belt for directing a flow of air against sulfur particles on said second belt and further including means for driving said second belt in a direction moving sulfur particles thereon away from the porous belt.

43. The apparatus as claimed in claim 40 including a means disposed beneath the porous belt for receiving both quenching liquid drained from sulfur particles on said belt and sulfur particles falling from said porous belt which are not discharged onto the second conveyor belt, and including means for recycling the received fallen particles back onto a particle receiving end region of said porous belt.

44. A process for producing comparatively large, high bulk density sulfur particles from molten sulfur, the process comprising the steps of:

a. filling a vessel with a molten sulfur quenching liquid to a liquid operating level;

b. flowing at least one substantially laminar stream of molten sulfur through at least one aperture into quenching liquid in said vessel at a rate and from a distance above said liquid operating level causing the molten sulfur to form into relatively large and dense particles upon contact with the quenching liquid; and moving said aperture along horizontal path in a substantially continuous manner sulfur is flowed therefrom into the vessel; and c. removing the sulfur particles from said vessel, some of the quenching liquid being removed from the vessel along with the sulfur particles.

45. The process as claimed in claim 44 wherein the distance above the liquid operating level from which molten sulfur is flowed into the vessel is between about $\frac{1}{4}$ inch and about 8 inches.

46. The process as claimed in claim 44 wherein the distance above the liquid operating level from which molten sulfur is flowed into the vessel is between about $\frac{1}{4}$ inch and about 2 inches.

47. The process as claimed in claim 44 including adding quenching liquid into the vessel at a rate maintaining the liquid in the vessel at said operating liquid level, the quenching liquid being added to the vessel in a manner causing the quenching liquid already in the vessel to remain in a substantially quiescent state.

48. The process as claimed in claim 47 wherein the quenching liquid is essentially water and the step of adding quenching liquid into the vessel comprises adding fresh water into the vessel.

49. The process as claimed in claim 44 wherein the step of flowing a substantially laminar flow stream of molten sulfur into the vessel comprises flowing the molten sulfur through a horizontally elongate discharge manifold having, in lower regions thereof, a number of molten sulfur discharge apertures through which substantially laminar streams of molten sulfur are flowed into the vessel.

50. The process as claimed in claim 49 including the step of moving the discharge manifold, as molten sulfur is discharged therefrom, in a horizontal plane in a manner moving each of the discharge apertures along a separate circular path, all of the aperture paths having substantially the same diameter.

51. The process as claimed in claim 50 including moving the discharge manifold so that each of the discharge apertures is moved in a circular path having a radius of between about 4 inches and about 6 inches.

52. The process as claimed in claim 44 including the step of supplying molten sulfur to be flowed into the vessel at a rate of at least about 30 short tons per hour and at a pressure head of at least about one foot of molten sulfur.

53. The process as claimed in claim 52 wherein the step of flowing molten sulfur into the vessel includes flowing the molten sulfur through a discharge manifold having between about 20 and about 40 spaced apart discharge apertures each having a diameter of between about ¼ inch and about ¾ inch.

54. The process as claimed in claim 44 including the step of removing from the sulfur particles most of the quenching liquid which is removed with the sulfur particles from the vessel.

55. The process as claimed in claim 54 wherein the step of removing quenching liquid from the sulfur particles includes discharging the removed sulfur particles onto a moving, porous conveyor belt in a comparatively thin layer and blowing air through both said sulfur layer and said belt.

56. The process as claimed in claim 55 wherein the step of removing quenching liquid from the sulfur particles includes the step of discharging the sulfur particles from the porous conveyor belt onto a second moving conveyor belt in a comparatively thin layer and blowing air onto said sulfur particle layer while it is on the second conveyor belt.

57. The process as claimed in claim 55 including the steps of collecting sulfur particles which fall off from the porous belt and are not discharged from the porous belt onto the second conveyor belt and recycling the collected fallen particles back onto a particle receiving end region of said porous belt.

58. The process as claimed in claim 55 wherein the step of removing quenching liquid from the sulfur particles includes the steps of discharging the sulfur particles removed from the vessel across an initial liquid draining means disposed between the vessel and the porous belt so as to drain a substantial amount of quenching liquid from the sulfur particles before the particles are deposited on the porous belt.

59. A process for producing comparatively large, high bulk density sulfur particles from molten sulfur, the process comprising the steps of:
   a. filling a quenching vessel to a liquid operating level with a quenching liquid having a specific gravity less than that of liquid sulfur;
   b. flowing a plurality of parallel, spaced apart, substantially laminar streams of molten sulfur through at least one aperture into the quenching liquid in the vessel at a rate and at a distance above said liquid operating level causing the molten sulfur from each of said streams to form into relatively large and dense particles which settle to lower regions of the vessel, and moving said aperture along a horizontal path in a substantially continuous manner as molten sulfur is flowed therefrom into the vessel;
   c. removing sulfur particles from said lower regions of the vessel and along therewith some of the quenching liquid;
   d. passing the removed sulfur particles over a stationary member having small openings therein so as to drain substantial amounts of quenching liquid from the particles; and
   e. discharging the removed particles from said member in a relatively thin layer onto a porous conveyor belt which transports the sulfur particles away from the vessel and through which additional amounts of quenching liquid are drained from the sulfur particles.

60. The process as claimed in claim 59 including the step of adding quenching liquid to the vessel at a rate maintaining the level of the liquid in the vessel at said operating level while flowing molten sulfur into the vessel.

61. The process as claimed in claim 60 wherein the step of adding quenching liquid into the vessel includes adding quenching liquid into the vessel in a manner maintaining the quenching liquid in the vessel in a quiescent state.

62. The process as claimed in claim 61 including filling the vessel to the operating level with water and wherein the step of adding quenching liquid into the vessel comprises adding fresh water into the vessel.

63. The process as claimed in claim 59 wherein the step of flowing a plurality of laminar streams of molten sulfur into the vessel includes flowing the molten sulfur into the vessel through a molten sulfur discharge manifold having a plurality of molten sulfur discharge apertures, and including the step of moving said manifold along a path so that each of the streams of molten sulfur discharged from the manifold apertures is moved along a different circular path, all of the paths having substantially the same diameter.

64. The process as claimed in claim 63 wherein the step of flowing molten sulfur into the vessel through the manifold apertures includes flowing the molten sulfur into the vessel at a rate of at least about 30 short tons per hour through between about 20 and about 40 spaced apart manifold apertures each of which has a diameter of between about ¼ inch and about ¾ inch.

65. The process as claimed in claim 59 including the step of blowing air through both the layer of sulfur particles on the porous belt and through the belt itself as the belt is transporting the sulfur particles away from the vessel.

66. The process as claimed in claim 59 including the steps of discharging sulfur particles from the porous conveyor belt onto a second, essentially non-porous conveyor belt which transports the sulfur particles towards a discharge point and blowing air onto the sulfur particles on said second, essentially non-porous conveyor belt as the second, essentially non-porous belt is transporting the particles.

67. The process as claimed in claim 66 including the steps of collecting sulfur particles which fall off from the porous conveyor belt and are not discharged onto the second conveyor belt and including the further step of recycling said collected sulfur particles back onto input regions of the porous belt.

68. A process for producing relatively large and dense sulfur particles from molten sulfur, the process comprising the steps of:
   a. filling a vessel to a liquid operating level with a quenching liquid having a specific gravity substantially less than that of liquid sulfur;
   b. providing a supply of molten sulfur;
   c. connecting a molten sulfur discharge manifold having a plurality of discharge apertures in a flow relationship to said molten sulfur supply;
   d. mounting the manifold relative to the vessel so that the manifold discharge apertures are above said liquid operating level;
   e. flowing molten sulfur from said source through said manifold discharge apertures in substantially laminar streams into the quenching liquid in the vessel;

f. moving the manifold in a horizontal plane as molten sulfur is flowed from the manifold apertures so that each of the discharge apertures traces out a different but similar path;

g. removing from the vessel sulfur particles formed therein by flowing the streams of molten sulfur into the quenching liquid and removing some of the quenching liquid along with the sulfur particles; and h. removing most of the quenching liquid from the sulfur particles removed from said vessel.

69. The process as claimed in claim 68 including the step of adding quenching liquid into the vessel at a rate maintaining the liquid in the vessel at the liquid operating level as molten sulfur is flowed into the vessel, the quenching liquid being added to the vessel in a manner maintaining the quenching liquid already in the vessel in a substantially quiescent state.

70. The process as claimed in claim 69 wherein the quenching liquid is essentially water and the step of adding quenching liquid to the vessel comprises adding fresh water into the vessel.

71. The process as claimed in claim 70 wherein the step of removing quenching liquid from the sulfur particles comprises removing water from the sulfur particles until the water content of the sulfur particles is less than about 5 percent.

72. The process as claimed in claim 68 including flowing molten sulfur into the vessel through between about 20 and about 40 manifold apertures, each of which has a diameter of between about ¼ inch and about ¾ inch, and at a rate of at least about 30 short tons per hour.

73. The process as claimed in claim 68 including mounting the manifold so that the discharge apertures thereof are between about ¼ inch and about 8 inches above said liquid operating level in the vessel.

74. The process as claimed in claim 68 including mounting the manifold so that the discharge apertures thereof are between about ¼ inch and about 2 inches above said liquid operating level in the vessel.

75. The process as claimed in claim 68 wherein the step of removing quenching liquid from the sulfur particles removed from the vessel over a screen element and then discharging the sulfur particles in a relatively thin layer onto a moving, porous conveyor belt and blowing air through said layer of sulfur particles and through the porous belt.

76. The process as claimed in claim 75 wherein the step of removing quenching liquid from the sulfur particles includes the steps of discharging the sulfur particles from the porous belt onto a second, essentially non-porous belt conveyor belt and blowing air onto the sulfur particles as they are transported by said second, essentially non-porous belt.

77. The process as claimed in claim 76 including the step of collecting sulfur particles which fall off from the porous belt and are not discharged onto the second, essentially non-porous belt and recycling the collected particles back onto the porous belt.

* * * * *

UNITED STATES PATENT AND TRADEMARK OFFICE
CERTIFICATE OF CORRECTION

PATENT NO. : 4,863,645
DATED : September 5, 1989
INVENTOR(S) : Bruce A. Harbolt and David W. Howell It is certified that error appears in the above-identified patent and that said Letters Patent is hereby corrected as shown below:

Column 12, line 22, sixth word, change "sulfer" to --sulfur--.

Column 12, line 25, change "sulfer" to --sulfur--.

Column 12, line 41, delete "with".

Column 14, line 4, change "continuing" to --containing--.

Column 15, line 14, change "particles" to --particle--.

Column 15, line 49, change "plaen" to --plane--.

Column 16, line 59, change "connected" to --contained--.

Column 18, line 17, delete "at least one" and insert therefor --a--.

Column 18, line 23, change the semicolon to a comma; after "along" insert --a--.

Column 18, line 24, after "manner" insert --as molten--.

Column 18, line 30, change "the" to --said--.

Column 22, line 14, after "cles" and before "removed" insert --comprises the steps of first passing the sulfur particles--.

Signed and Sealed this

Eighteenth Day of December, 1990

*Attest:*

HARRY F. MANBECK, JR.

*Attesting Officer*  *Commissioner of Patents and Trademarks*